US012764627B2

(12) United States Patent
Chang et al.

(10) Patent No.: US 12,764,627 B2
(45) Date of Patent: Oct. 13, 2026

(54) RELAY COMMUNICATION MANAGEMENT IN RESPONSE TO CELLULAR CONNECTION RADIO LINK FAILURE (RLF)

(71) Applicants: Kyocera Corporation, Kyoto (JP); Henry Chang, San Diego, CA (US); Masato Fujishiro, Yokohama (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 294 days.

(21) Appl. No.: 18/287,443

(22) PCT Filed: May 6, 2022

(86) PCT No.: PCT/US2022/028178
§ 371 (c)(1),
(2) Date: Oct. 18, 2023

(87) PCT Pub. No.: WO2022/240695
PCT Pub. Date: Nov. 17, 2022

(65) Prior Publication Data

US 2024/0214900 A1 Jun. 27, 2024

Related U.S. Application Data

(60) Provisional application No. 63/186,574, filed on May 10, 2021.

(51) Int. Cl.
*H04W 36/00* (2009.01)
*H04W 36/30* (2009.01)
(Continued)

(52) U.S. Cl.
CPC ....... *H04W 36/305* (2018.08); *H04W 36/033* (2023.05); *H04W 40/22* (2013.01); *H04W 88/04* (2013.01); *H04W 92/18* (2013.01)

(58) Field of Classification Search
None
See application file for complete search history.

(56) References Cited

U.S. PATENT DOCUMENTS 10,666,334 B2 5/2020 Xiong et al.
11,490,448 B1 11/2022 Kuo
(Continued)

FOREIGN PATENT DOCUMENTS

EP 4164327 A1 * 4/2023 ............ H04W 36/36
WO 2021-040378 A1 3/2021
(Continued)

OTHER PUBLICATIONS

Vivo; "RRC Connection Management for L2 relay", R2-2103325; 3GPP TSG-RAN WG2 Meeting #113bis-e; Apr. 2, 2021.
(Continued)

*Primary Examiner* — Gerald A Smarth

(57) ABSTRACT

An initial relay user equipment (UE) device transmits a llu radio link failure (RLE) notification to a remote UE device when the Uu communication link from the initial relay UE device to the serving base station fails. The remote UE device refrains from sending signals to the serving base station through the initial relay UE device at least until receiving a Uu link reestablished notification indicating that the Uu communication link has been reestablished. In some situations, the remote UE device identifies a preferred candidate relay UE device after receiving the Uu RLF notification and selects the preferred candidate relay UE device for relay communication in response to receiving a Uu link reestablished notification indicating the Uu communication link could not be reestablished.

17 Claims, 10 Drawing Sheets

100

(51) Int. Cl.

| | |
|---|---|
| ***H04W 40/22*** | (2009.01) |
| *H04W 88/04* | (2009.01) |
| *H04W 92/18* | (2009.01) |

(56) References Cited

U.S. PATENT DOCUMENTS

| | | | |
|---|---|---|---|
| 2010/0329216 | A1 | 12/2010 | Jen |
| 2012/0076121 | A1 | 3/2012 | Choi et al. |
| 2012/0327801 | A1 | 12/2012 | Seo et al. |
| 2015/0031366 | A1 | 1/2015 | Lee et al. |
| 2018/0070400 | A1 | 3/2018 | Wu et al. |
| 2018/0092022 | A1 | 3/2018 | Huang et al. |
| 2018/0110001 | A1 | 4/2018 | Yasukawa et al. |
| 2018/0139682 | A1 | 5/2018 | Xu et al. |
| 2018/0184436 | A1 | 6/2018 | Ohtsuji et al. |
| 2018/0255505 | A1 | 9/2018 | Thyagarajan et al. |
| 2019/0320361 | A1 | 10/2019 | Uchiyama et al. |
| 2019/0327661 | A1 | 10/2019 | Li et al. |
| 2019/0387446 | A1 | 12/2019 | Xu et al. |
| 2021/0168779 | A1 | 6/2021 | Mondal et al. |
| 2021/0385714 | A1 | 12/2021 | Paladugu et al. |
| 2022/0030483 | A1 | 1/2022 | Cheng et al. |
| 2022/0046485 | A1 | 2/2022 | Hong et al. |
| 2022/0078693 | A1 | 3/2022 | Ly et al. |
| 2022/0264401 | A1 | 8/2022 | Yan et al. |
| 2022/0330352 | A1 | 10/2022 | Horn et al. |
| 2023/0063139 | A1 | 3/2023 | Du |
| 2023/0086337 | A1* | 3/2023 | Sharma ............... H04W 36/033 370/329 |
| 2023/0180313 | A1 | 6/2023 | Freda et al. |
| 2023/0199803 | A1 | 6/2023 | Kang et al. |
| 2023/0363020 | A1 | 11/2023 | Back et al. |
| 2023/0397075 | A1 | 12/2023 | Zhao |
| 2024/0007922 | A1 | 1/2024 | Cheng et al. |
| 2024/0015809 | A1 | 1/2024 | Cheng et al. |
| 2024/0056951 | A1 | 2/2024 | Back et al. |
| 2024/0064593 | A1 | 2/2024 | Wu et al. |
| 2024/0137995 | A1 | 4/2024 | Cai et al. |
| 2024/0147326 | A1 | 5/2024 | Xu et al. |
| 2024/0155643 | A1 | 5/2024 | Khoshkholgh Dashtaki et al. |
| 2024/0172084 | A1 | 5/2024 | Xu et al. |
| 2024/0179726 | A1 | 5/2024 | Wang et al. |
| 2024/0205768 | A1 | 6/2024 | Cheng et al. |
| 2024/0214910 | A1 | 6/2024 | Wu et al. |
| 2024/0236789 | A1 | 7/2024 | Wu et al. |
| 2024/0259906 | A1 | 8/2024 | Freda et al. |
| 2024/0260111 | A1 | 8/2024 | Zhang et al. |
| 2025/0071640 | A1 | 2/2025 | Chang et al. |
| 2025/0150912 | A1 | 5/2025 | Chang et al. |
| 2025/0168724 | A1 | 5/2025 | Wu et al. |
| 2025/0227662 | A1 | 7/2025 | Orsino et al. |
| 2025/0351213 | A1 | 11/2025 | Wu et al. |
| 2026/0059407 | A1 | 2/2026 | Fujishiro et al. |

FOREIGN PATENT DOCUMENTS

| | | | | |
|---|---|---|---|---|
| WO | WO-2021090687 | A1 * | 5/2021 | .......... H04W 36/305 |
| WO | WO-2021197807 | A1 * | 10/2021 | .......... H04W 36/033 |
| WO | 2022-240697 | A1 | 11/2022 | |

OTHER PUBLICATIONS

Huawei, Hisilicon; "Discussion on the CP procedures for L2 Relay", R2-2104131; 3GPP TSG-RAN WG2 Meeting #113bis-e; Apr. 2, 2021.

LG Electronics Inc.; "Relay (re-)selection and path switching", R2-2103994; 3GPP TSG-RAN WG2 Meeting #113bis-e; Apr. 2, 2021.

ZTE Corporation, Sanechips; "Discussion on remaining issues on L2 UE-to-Network Relay", R2-2100300; 3GPP TSG-RAN WG2 Meeting #113-e; Jan. 15, 2021.

CATT; "Service Continuity for L2 U2N Relay", R2-2102701; 3GPP TSG RAN WG2 Meeting #113bis-e; Apr. 2, 2021.

Nokia, Nokia Shanghai Bell; "Discussion on relay selection and reselection", R2-2103667; 3GPP TSG RAN WG2 Meeting #113bis-e; Apr. 1, 2021.

Huawei, Hisilicon; "Discussion on path switch for L2 UE to NW Relay", R2-2104132; 3GPP TSG RAN WG2 Meeting #113bis-e; Apr. 2, 2021.

Philips; "Relay UE load as an additional AS criterion for relay (re-)selection", R2-2104262; 3GPP TSG RAN WG2 Meeting #113bis-e; Apr. 2, 2021.

3GPP; "3rd Generation Partnership Project; Technical Specification Group Radio Access Network; Study on NR sidelink relay; (Release 17)", 3GPP TR 38.836 V17.0.0 (Mar. 2021); Mar. 29, 2021.

Vivo; "Discussions on Relay (re-)selection procedure", R2-2103324; 3GPP TSG RAN WG2 Meeting #113bis-e; Apr. 2, 2021.

Mediatek. "Introduction of Rel-17 Sidelink Relay." R2-2201725, 3GPP TSG-RAN WG2 Meeting #116bis Electronic, Jan. 17-25, 2022, 43 pages.

Qualcomm Incorporated; "Further discussion on control plane procedures of L2 U2N relay," R2-2104738; 3GPP TSG-RAN WG2 Meeting 114-e; May 2021.

Qualcomm Incorporated; "Service continuity of L2 U2N relay," R2-2104739; 3GPP TSG-RAN WG2 Meeting 114-e; May 2021.

ZTE, Sanechips; "Consideration on service continuity of SL relay," R2-2104979; 3GPP TSG-RAN WG2 Meeting 114-e; May 19, 2021.

Huawei, Hisilicon; "Discussion on service continuity and adaptation layer for L2 UE to NW Relay," R2-2105741; 3GPP TSG-RAN WG2 Meeting 114-e; May 19, 2021.

Kyocera; "Open issues on service continuity for relaying," R2-2108322; 3GPP TSG-RAN WG2 Meeting 115-e; Aug. 9, 2021.

3GPP TS 38.300 V16.6.0 (Jun. 2021); 3rd Generation Partnership Project; Technical Specification Group Radio Access Network; NR; NR and NG-RAN Overall Description; Stage 2 (Release 16); 2021.

3GPP TR 38.836 V17.0.0 (Mar. 2021); 3rd Generation Partnership Project; Technical Specification Group Radio Access Network; Study on NR sidelink relay (Release 17); 2021.

* cited by examiner

500

RELAY COMMUNICATION MANAGEMENT IN RESPONSE TO CELLULAR CONNECTION RADIO LINK FAILURE (RLF)

CLAIM OF PRIORITY

The present application claims the benefit of priority to Provisional Application No. 63/186,574 entitled "Sidelink L2 Relay Reselection Upon Radio Link Failure", filed May 10, 2021, assigned to the assignee hereof and hereby expressly incorporated by reference in its entirety.

FIELD

This invention generally relates to wireless communications and more particularly to management of wireless communication links using relay devices.

BACKGROUND

Many wireless communication systems that employ several base stations that provide wireless service to user equipment (UE) devices enable sidelink communication between two or more UE devices where the UE devices can communicate directly with other UE devices. With sidelink communication, UE devices transmit data signals to each other over a communication link using the cellular resources instead of through a base station. Such Proximity Services (ProSe) communication is sometimes also referred to as device-to-device (D2D). In addition, one or more UE devices can be used as relay devices between a UE device and a destination where the relay device forwards data between a UE device and the destination. The destination may be a communication network or another UE device (destination UE device). Where the destination is the network, the relay functionality is typically referred to as UE-to-Network (U2N) relaying and the relay UE device establishes a communication path between the remote UE and a base station (gNB) or cell. In some situations, for example, the UE device may be out of the service area of the base station and the relay UE device provides a communication link routed from such an out-of-coverage (OoC) UE device through a relay UE device to the base station.

SUMMARY

An initial relay user equipment (UE) device transmits a Uu radio link failure (RLF) notification to a remote UE device when the Uu communication link from the initial relay UE device to the serving base station fails. The remote UE device refrains from sending signals to the serving base station through the initial relay UE device at least until receiving a Uu link reestablishment notification indicating that the Uu communication link has been reestablished. In some situations, the remote UE device identifies a preferred candidate relay UE device after receiving the Uu RLF notification and selects the preferred candidate relay UE device for relay communication in response to receiving a Uu link reestablishment notification indicating the Uu communication link could not be reestablished. In other situations, the remote UE device performs relay selection after receiving the Uu RLF notification and notifies the initial relay UE device when a relay communication is established through a selected relay UE device.

DETAILED DESCRIPTION

Figure 1A:
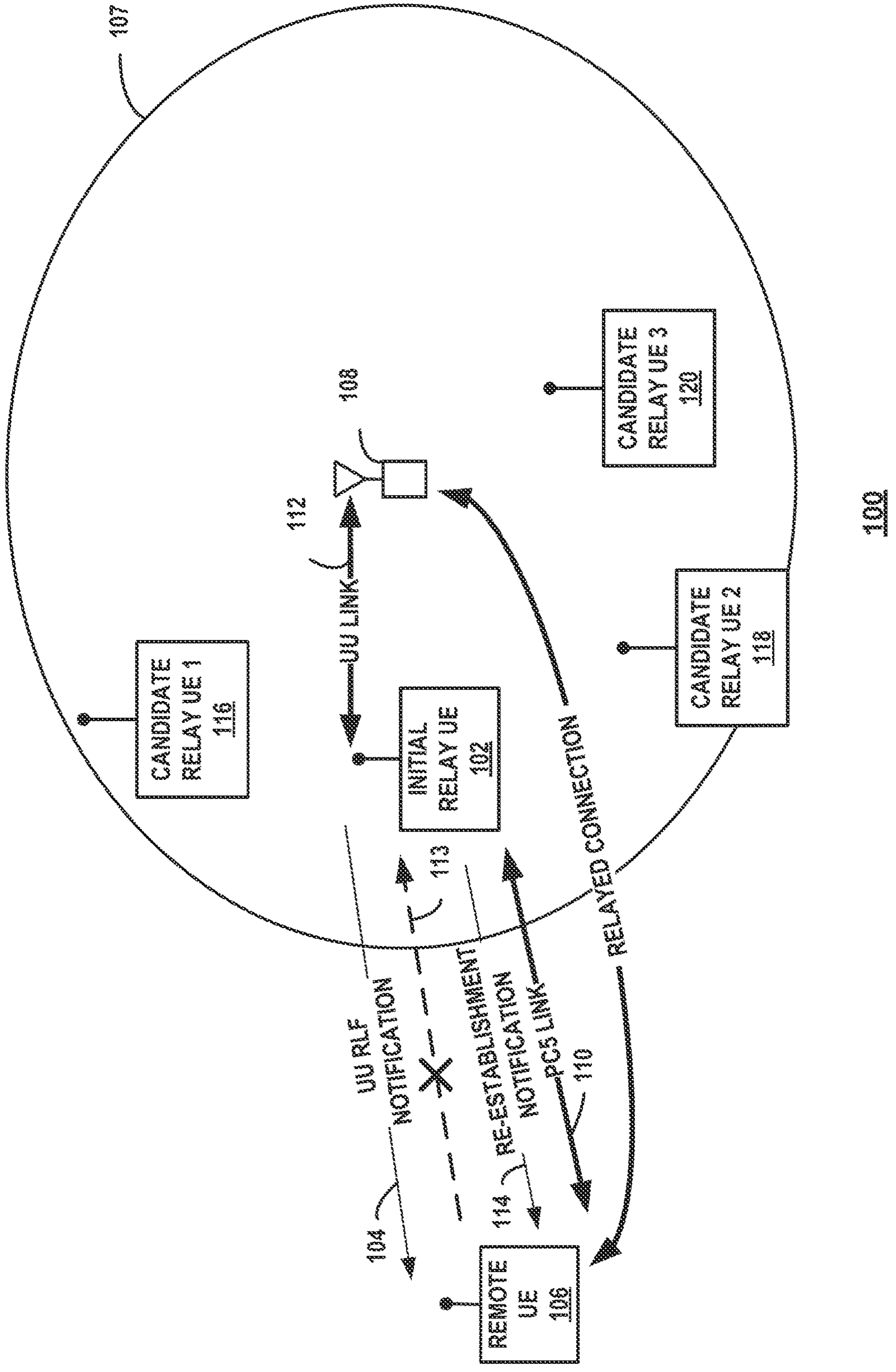
FIG. 1A is a block diagram of communication system for an example where an initial relay UE device transmits a Uu radio link failure (RLF) notification to a remote UE device.

As discussed above, a relay UE device provides connectivity between a remote UE device and a destination which can be another UE device (destination UE device) or a network. Where the destination is the network, the relay provides connectivity to a cell provided by a base station (gNB) of the network. The relayed connection between a remote UE device and target UE device is sometimes referred to as a UE to UE (U2U) relay connection. The relayed connection between a remote UE device and a base station (gNB) is sometimes referred to as a UE to network (U2N) relay connection. In some situations, the ultimate destination is a target UE device through the base station. In conventional systems where the relay connects to a base station (gNB), the relay UE device is required to meet certain criteria to function as a relay. For example, the relay UE device must be in coverage and have a cellular (Uu) communication link to the base station of sufficient quality in order to be available for U2N relaying functions.

Sidelink relaying functionality allows a remote UE that is out-of-coverage (OoC) to connect with the gNB or base station via a relay UE device. With UE-to-Network (U2N) relaying, the relay UE needs to be in coverage of a cell and connected to the gNB. The relayed connection from the remote UE device to the base station (gNB) includes a PC5 link (sidelink) between the remote UE device and the relay UE device and the Uu link between the relay UE device and the gNB.

Generally, when radio link failure (RLF) of the relayed connection occurs, the remote UE device should try to connect to the gNB via a different relay UE device. This process is typically referred to as relay reselection. However, the remote UE device behavior for relay reselection may differ depending on whether the RLF occurs on the Uu link or the PC5 link. If the remote UE detects PC5 RLF, the remote UE device does not have a way to connect to the gNB without performing relay reselection since there is no such concept as PC5 or Sidelink re-establishment. Therefore, the remote UE device will typically begin the relay reselection procedure. Even if the relay UE device detects the PC5 RLF and sends an indication to the gNB, the remote UE device should still be considered to be in the Radio Resource Control (RRC) Connected state (RRC CONN state) and the remote UE device may attempt to re-establish connection to the gNB, either through direct link (via the Uu link) or indirectly via another relay UE device (via the sidelink+Uu link).

Where the RLF occurs on the Uu link in conventional systems, however, the remote UE device is not aware of RLF on the Uu link since the relay UE device is the device that detects the RLF. For the examples herein, the relay UE device informs the remote UE device of the Uu RLF condition. In addition, the examples include techniques for relay reselection at the remote UE device upon receiving the Uu RLF indication from the relay UE device.

Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (Rel-17).

FIG. 1A is a block diagram of communication system 100 for an example where an initial relay UE device 102 transmits a Uu radio link failure (RLF) notification 104 to a remote UE device 106. The example begins with the remote UE device 106 connected to a serving base station (gNB) 108 through the initial relay UE device 102 where the remote UE device 106 is out of coverage (OoC). The remote UE device 106, therefore, is outside of the coverage cell 107 provided by the base station 108. The relayed connection between the remote UE device 106 and the base station 108 includes a PC5 communication link 110 between remote UE device 106 and the initial relay UE device 102 and a Uu link 112 between the initial relay UE device 102 and the base station (gNB) 108. When the initial relay UE device 102 determines that a Uu link RLF has occurred, the relay UE device 102 attempts to reestablish the Uu link 112 and notifies the remote UE device 106 of the RLF by transmitting the Uu RLF notification (RLF indicator) 104 to the remote UE device 106. Although the example of FIG. 1A shows a single remote UE device receiving relay services from the relay UE device 102, the relay UE device 102 may be providing relay services to multiple devices. Accordingly, the relay UE device 102 notifies all UE devices receiving relay U2N relay service from the relay UE device 102 of the RLF. Although other techniques may be used to notify the remote UE device 106 of the Uu RLF, the relay UE device 102 transmits a PC5-RRC message indicating the Uu RLF.

For the examples herein, the remote UE device 106 refrains from sending signals 113 to the base station 108 through the initial relay UE device 102 in response to receiving the Uu RLF notification 104. In the examples, the initial relay UE device sends a reestablishment notification 114 indicating whether the Uu link 112 has been reestablished. The reestablishment notification 114 may be a PC5-RRC message indicating where the UU link has or has not been reestablished. In some situations when reestablishment of the Uu link is unsuccessful, the reestablishment notification 114 may be a PC5-S message that is a release message formatted and transmitted in accordance with conventional systems to release the PC5 link. In some examples, therefore, a failed reestablishment notification (failed recovery message) is a different type of message from a successful reestablishment notification (recovery message). In other examples, the reestablishment notification is a single type of message that includes information (e.g., on-bit flag) indicating whether or not the reestablishment was successful. Other types of notification techniques may also be used in other situations. As discussed herein, there are at least three examples of additional action that can be taken by the remote UE device 106 in response to receiving the Uu RLF notification 104 and/or the reestablishment notification 114.

In a first example, the remote UE device 106 waits to receive a reestablishment notification 114 before taking any other action to reconnect to the base station 108. In some situations, the remote UE device 106 attempts to reconnect to the base station 108 when a timer has expired before a reestablishment notification has been received.

In a second example, the remote UE device 106 identifies a preferred candidate relay UE device and does not take any other action to reconnect to the base station 108 until the reestablishment notification 114 is received from the initial relay UE device 102. The remote UE device 106 evaluates candidate relay UE devices 116, 118, 120 to identify the preferred candidate relay UE device. The remote UE device 106 may transmit a Model B discovery request where, for example, when no Model A discovery messages are received. For the second example, the remote UE device 106 establishes a relay connection via the preferred candidate relay UE device in response to receiving a reestablishment notification 114 indicating the Uu link was not successfully reestablished. In some situations, the remote UE device 106 maintains a candidate relay UE device priority list where the devices are prioritized at least partially based on the measured SD-RSRP level of the discovery signals received from the candidate relay UE devices 116, 118, 120. In one example discussed below, the candidate relay UE devices 116, 118, 120 transmit an RRC connection status indicator as part of the discovery message and the candidate relay UE device priority list is at least partially based on the connection status of each candidate relay UE device. An advantage of maintaining the candidate relay UE device priority list is the reduction in latency for a pending transmission as compared to beginning the relay reselection process only after determining the Uu link was not successfully reestablished.

In a third example, the remote UE device performs a relay reselection procedure after receiving the Uu RLF notification 104. The remote UE device 106, evaluates the candidate relay UE devices 116, 118, 120 to select an alternate relay UE device for connection to the base station 108. In the third example, therefore, the remote UE device 106 attempts to reconnect to the base station 108 immediately after receiving the Uu RLF notification 104. The remote UE device 106 may notify the initial relay UE device 102 when the remote UE device has successfully selected another relay device. In some situations, the remote UE device establishes a new relayed connection to the base station through an alternate relay UE device while remaining connected to the initial relay UE device. The remote UE device may remain connected to the base station through multiple relayed connections and relay UE devices where, for example, the initial relayed connection is successfully reestablished after the remote UE device has established a new link to the bases station. Multiple relayed connections do not need to be maintained and in some circumstances one or more of the relayed paths may be terminated. The three examples are discussed in further detail below.

Figure 1B:
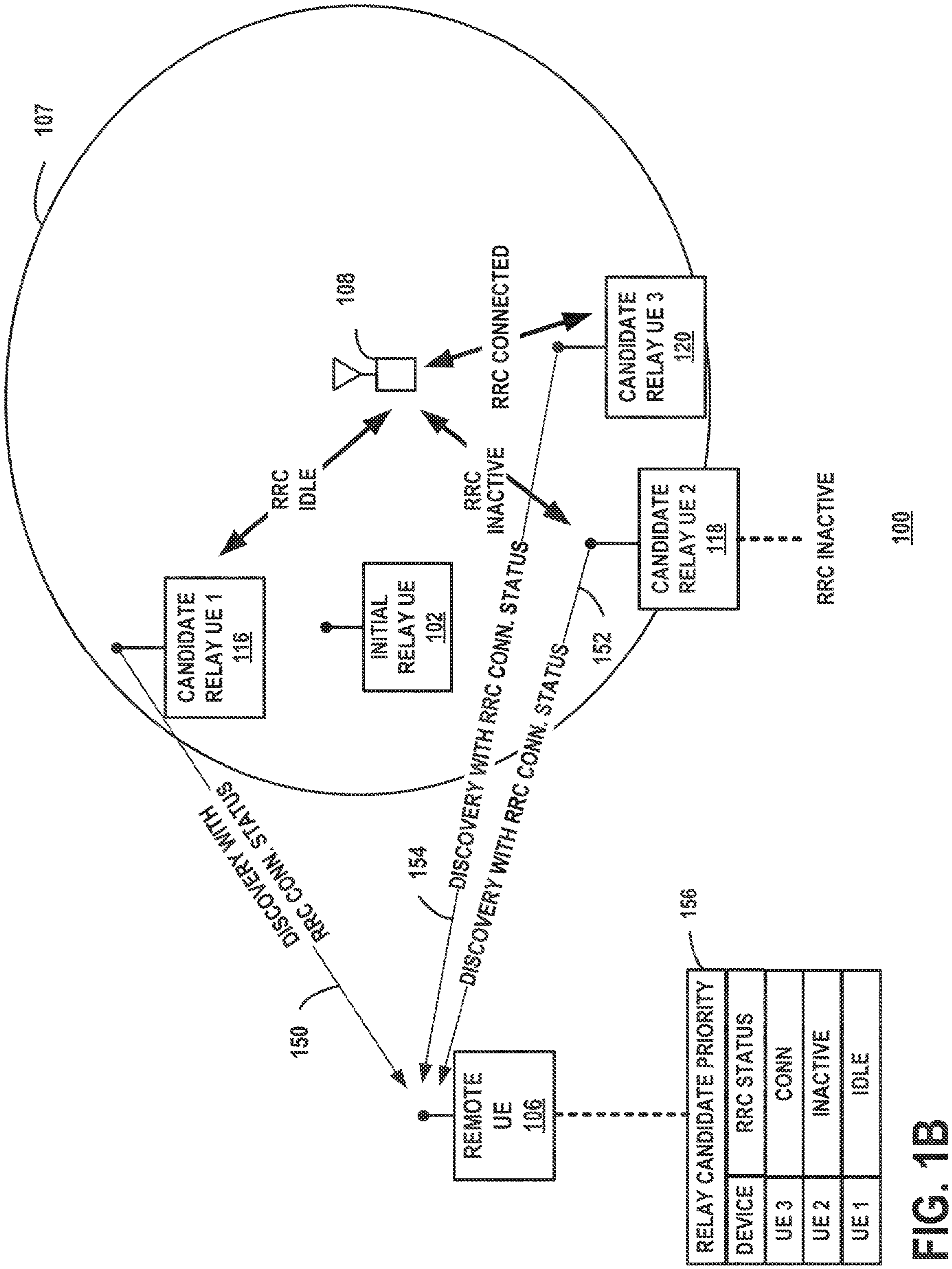
FIG. 1B is a block diagram of the system for an example where the candidate relay UE devices transmit Radio Resource Control (RRC) connection status indicators.

FIG. 1B is a block diagram of the system 100 for an example where the candidate relay UE devices 116, 118, 120 transmit RRC connection status notifications (indicators) 150, 152, 154. For the example, the RRC connection status indicators 150, 152, 154 are transmitted as part of a discovery message where the discovery message may be a Model A message or a Model B response message. In some situations, the transmission of an RRC connection status indicator is in response a change in RRC connection status at the relay UE device. A change in RRC connection status, for example, may trigger the transmission of a Model A discovery message with the RRC connection status indicator. The RRC connection status indicators 150, 152, 154 may be any information or identifier that indicates to another UE device (e.g., remote UE device 106) the current RRC connection status of the relay UE device transmitting the indicator. For the example, the RRC connection status indicator indicates one of the following three status states in accordance with one or more revisions of the 3GPP New Radio (NR) V2X communication specification: RRC connected (RRC CONN), RRC idle (RRC IDLE) or RRC inactive (RRC INACTIVE). In accordance with the example of FIG. 1B, the remote UE device 106 maintains a candidate relay priority list 156 where the candidate relay UE devices 116, 118, 120 are prioritized for relay service based, at least partially, on the RRC connection status. A candidate relay UE device in the RRC CONN state is prioritized higher than a candidate relay UE device in the RRC INACTIVE state. A candidate relay UE device in the RRC IDLE state has the lowest priority. The prioritization may be based on additional factors. For example, the prioritization may be based on the measured SD-RSRP levels of the discovery signals received from the candidate relay UE devices. The prioritization, therefore, may be based on the combination of the connection status and the SD-RSRP level as well as other criteria. Where two candidate relay UE devices have the same connection status, the candidate relay UE device with the higher measured SD-RSRP is assigned a higher priority. Usually in network planning, a cell edge corresponds to an RSRP level that is better than −120 dBm. Similarly, for SD-RSRP, the preference would also be for selecting candidate relay UE devices at an SD-RSRP level that is greater than −120 dBm, although lower levels may still work as long as the level is above the sensitivity level of the UE device. Therefore, if the measured SD-RSRP for a candidate relay UE device in RRC CONNECTED is just under −120 dBm, while another candidate relay UE device in RRC IDLE is above −120 dBm, the remote UE device may decide to connect with the candidate UE device in RRC IDLE. This especially may be the case where the remote UE device and the candidate relay UE device are in relative motion.

Figure 1C:
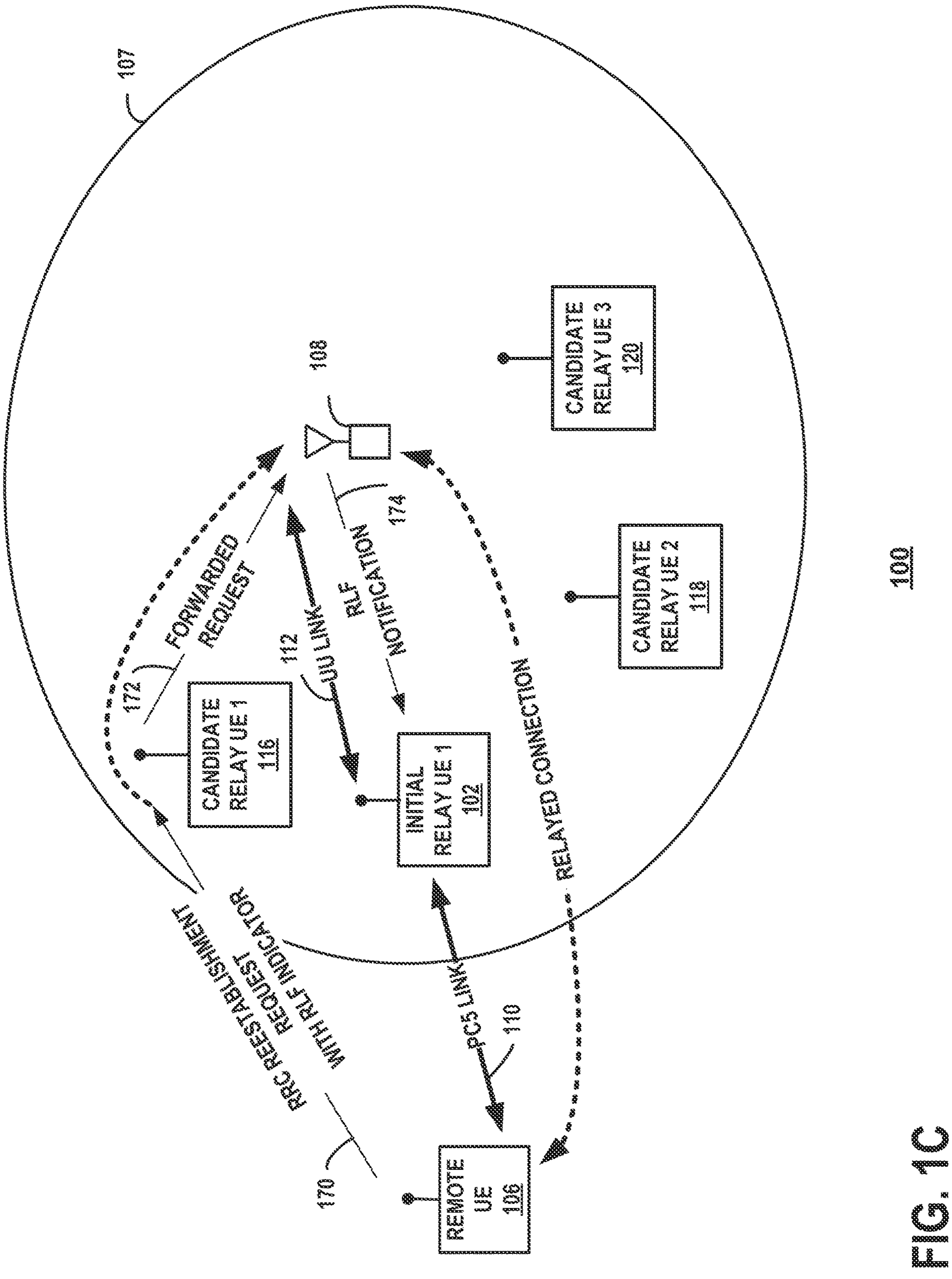
FIG. 1C is a block diagram of the system for an example where the remote UE device sends an RLF indicator to the serving base station after selecting an alternate relay UE device.

FIG. 1C is a block diagram of the system 100 for an example where the remote UE device 106 sends an RLF indicator 170 to the serving base station 108 after selecting an alternate relay UE device 116. For the example, the relayed communication link through the initial relay UE device experiences an RLF, either of the PC5 link 110 or the UU link 112. After establishing a new relayed communication link through the alternate relay UE device 116, the remote UE device 106 sends an RRC reestablishment request message 170 including the RLF indicator over a new relayed connection to the base station 108. The request 170 is received by the relay UE device 116 and forwarded to the base station as the forwarded request 172. The RLF indicator indicates whether an RLF was detected of the PC5 link 110 or of the Uu link 112. Where the PC5 link experiences the RLF, it is possible that the initial relay UE device 102 is not aware of the PC5 RLF at the time when the remote UE device is reestablishing the RRC connection with the base station 108 through another path (either directly or indirectly through an alternate relay UE device). In this case, the base station 108 will not have received a PC5 RLF from the initial relay UE device 102 and, for the example, the base station notifies the initial relay UE device of the PC5 RLF. In one example, the notification is an RLF notification message 174. In response to the RLF notification message 174, the initial relay UE device 102 notifies the upper layer of the RLF. In other examples, the base station sends an RRC reconfiguration message to the initial relay UE device to remove the RLC channel associated with the remote UE device 106. In case the RLF is associated with the Uu link, it also allows the base station 108 to realize that any transmission to the initial relay UE 116 (including any remote UE device that is still PC5 connected to the initial relay UE device 116) will likely fail.

Figure 2:
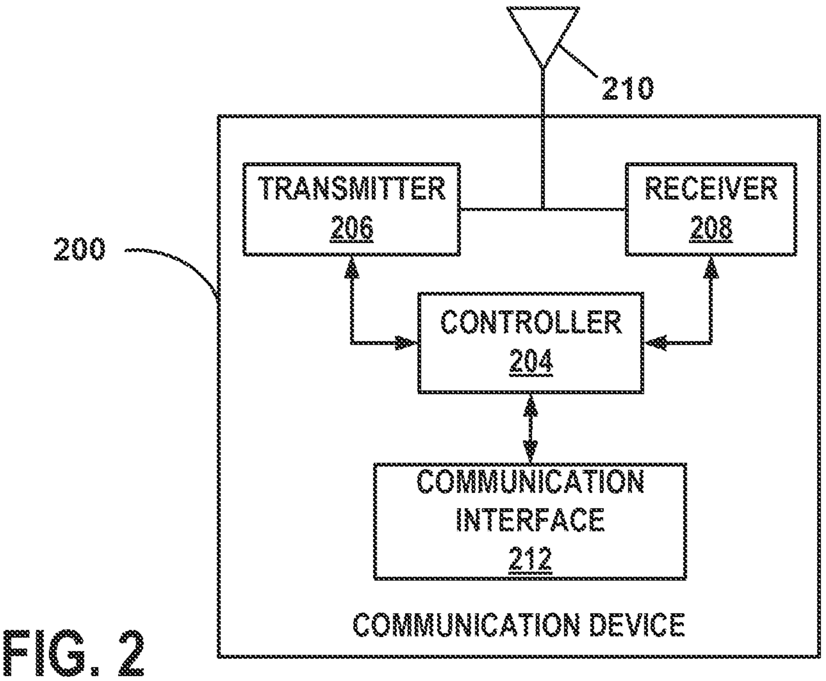
FIG. 2 is a block diagram of an example of a base station.

FIG. 2 is a block diagram of an example of a base station 200 suitable for use as the base station 108 and any base station providing a cell or otherwise serving any of the UE devices. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 108, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
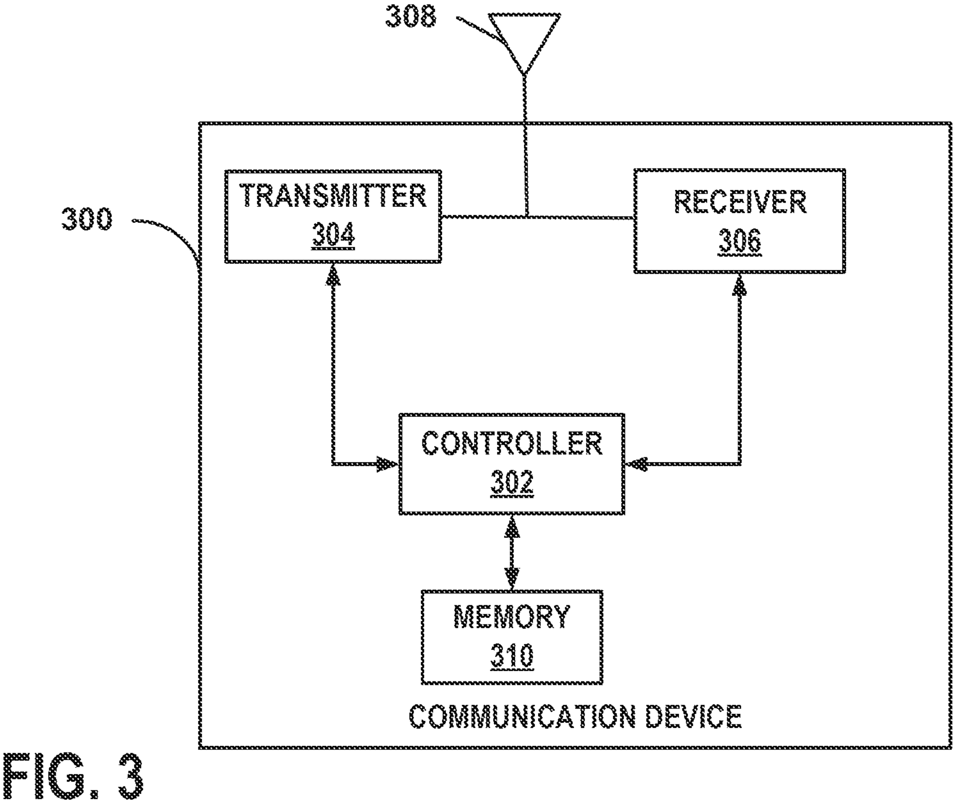
FIG. 3 is a block diagram of an example of a UE device suitable for use as each of the UE devices.

FIG. 3 is a block diagram of an example of a UE device 300 suitable for use as each of the UE devices 102, 106, 116, 118, 120. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

The communication device 300 include memory 310 in addition to memory that is part of the controller 302. Information such as candidate relay prioritization list may be stored and maintained on the memory 310, the controller, or a combination of the two.

Figure 4A:
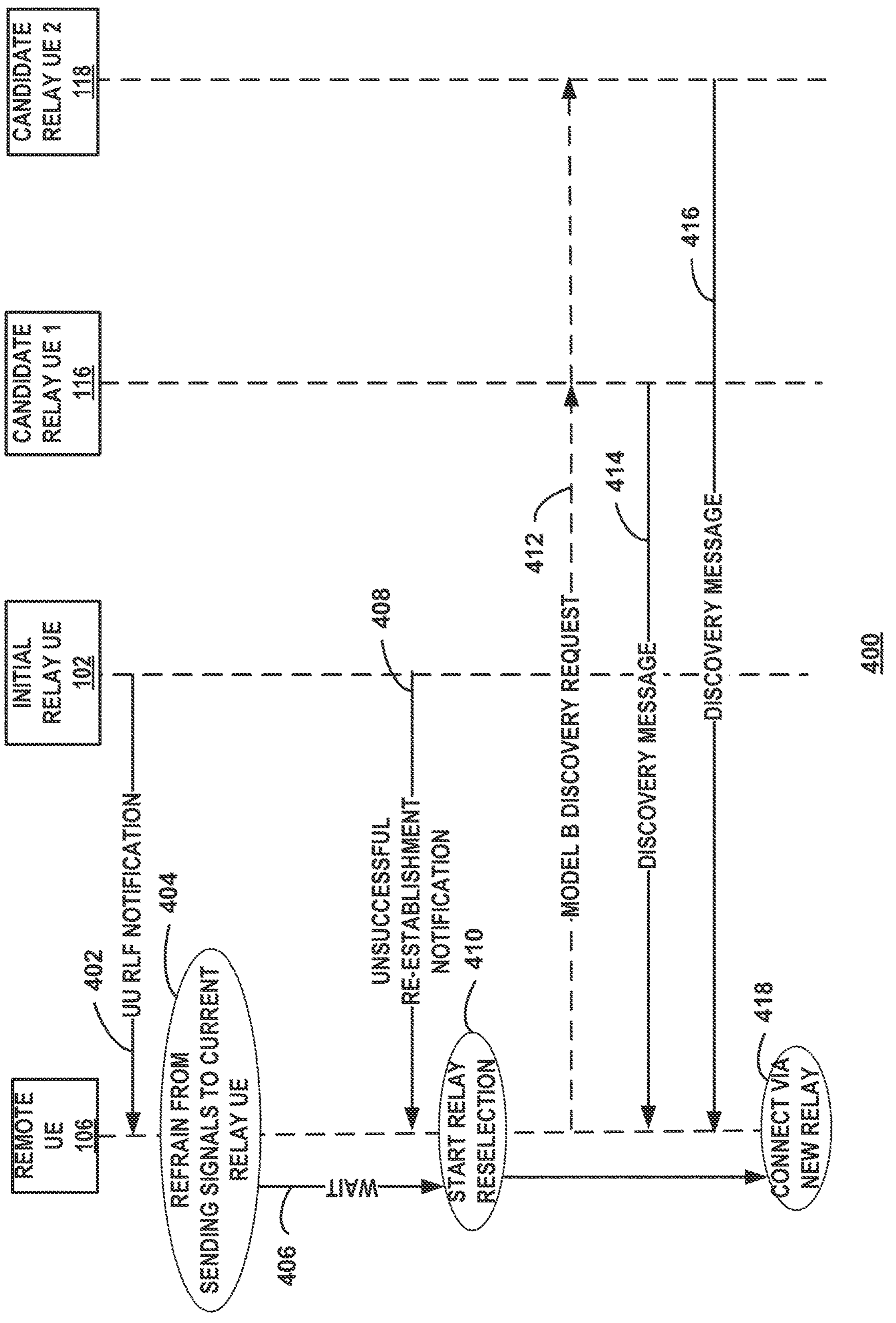
FIG. 4A is a message diagram for an example of relay link management where the remote UE device refrains from transmitting signals to the base station via the initial relay UE device in response to receiving a RLF notification.

FIG. 4A is a message diagram 400 for an example of relay link management where the remote UE device 106 refrains from transmitting signals to the base station 108 via the initial relay UE device 102 in response to receiving a RLF notification. Although FIG. 4 shows two candidate relay UE devices 116, 118, any number of candidate relay devices may be involved in the messaging. The example begins with the remote UE device 106 connected to the base station (gNB) 108 via a relay connection through the initial relay UE device 102.

At transmission 402, the initial relay UE device 102 sends a Uu RLF notification 104 that indicates to the remote UE device 106 that the Uu link between the initial relay UE device 102 and the serving base station (gNB) 108 has experienced a radio failure. As discussed above, an example of a suitable technique for providing the Uu RLF notification includes sending a PC5-RRC message to the remote UE device 106.

At event 404, the remote UE device 106 refrains from sending signals to base station through the current relay UE device 102. Accordingly, the remote UE device 106 stops sending data and control signals to the base station 108 over the relay connection that includes the initial relay UE device 102.

At event 406, the remote UE device continues to refrain from sending signals through the initial relay UE device and waits. In some situations, the remote UE device 106 waits to receive a reestablishment notification indicating whether the Uu link has been reestablished. In other situations, other events may trigger the remote UE device to take action. For example, the remote UE device 106 may perform relay reselection when an elapsed time since receipt of the RLF notification exceeds a time period threshold. In another example, the remote UE device 106 performs relay reselection when it is determined that the PC5 link with the initial relay UE device 102 has been released, has fallen below minimum quality threshold, or is otherwise unusable.

At transmission 408, a reestablishment notification is sent from the initial relay UE device 102 indicating that the reestablishment attempt was unsuccessful. As discussed above, the reestablishment notification 114 may be a PC5-

RRC message indicating whether the Uu link has been reestablished. When the reestablishment is unsuccessful, the reestablishment notification 114 may be a PC5-S message that is a release message in accordance with convention systems to release the PC5 link.

At event 410, the remote UE device begins a relay reselection procedure. The remote UE device 106 starts the process of receiving messages and evaluating information to select an alternate relay UE device.

At transmission 412, a Model B discovery request is sent to the nearby candidate relay UE devices. In some situations, the Model B discovery request may be omitted. Accordingly, the arrow representing the Model B discovery request is illustrated with a dashed line to indicate that the transmission may not be needed. For example, where Model A discovery messages are received from the candidate relay UE devices, the Model B request may not be needed.

At transmission 414, a discovery message is sent from the candidate relay UE device 116. At transmission 416, a discovery message is sent from the candidate relay UE device 118. The discovery messages of the transmissions 414, 416 may be Model A discovery announcement messages or may be Model B discovery response messages. For the example, discovery messages include an RRC connection status notification indicating the RRC connection status of the relay UE device transmitting the discovery message. The remote UE device 106 receives the discovery messages and evaluates received signals and information as part of the relay reselection procedure. For the examples, the remote UE device measures the SD-RSRP levels of the received discovery messages and evaluates the RRC connection status of the candidate relay UE devices 116, 118.

At event 418, the remote UE device selects a preferred candidate relay UE device and establishes a relayed connection to the base station 108 through the selected preferred candidate relay UE device. For the examples, the remote UE device prioritizes the candidate relay UE devices based on at least the measured SL RSRP levels and the RRC connection status notifications. The candidate relay UE device 116, 118 with the highest priority is selected as the preferred new relay device.

For the example of FIG. 4A, therefore, the remote UE device 106 stops sending signals to the base station 108 through the initial relay UE device 102 after receiving the RLF notification and waits until receiving the reestablishment notification, or otherwise determining the initial relay UE device 102 should not be used for the relay connection, before taking further action.

Figure 4B:
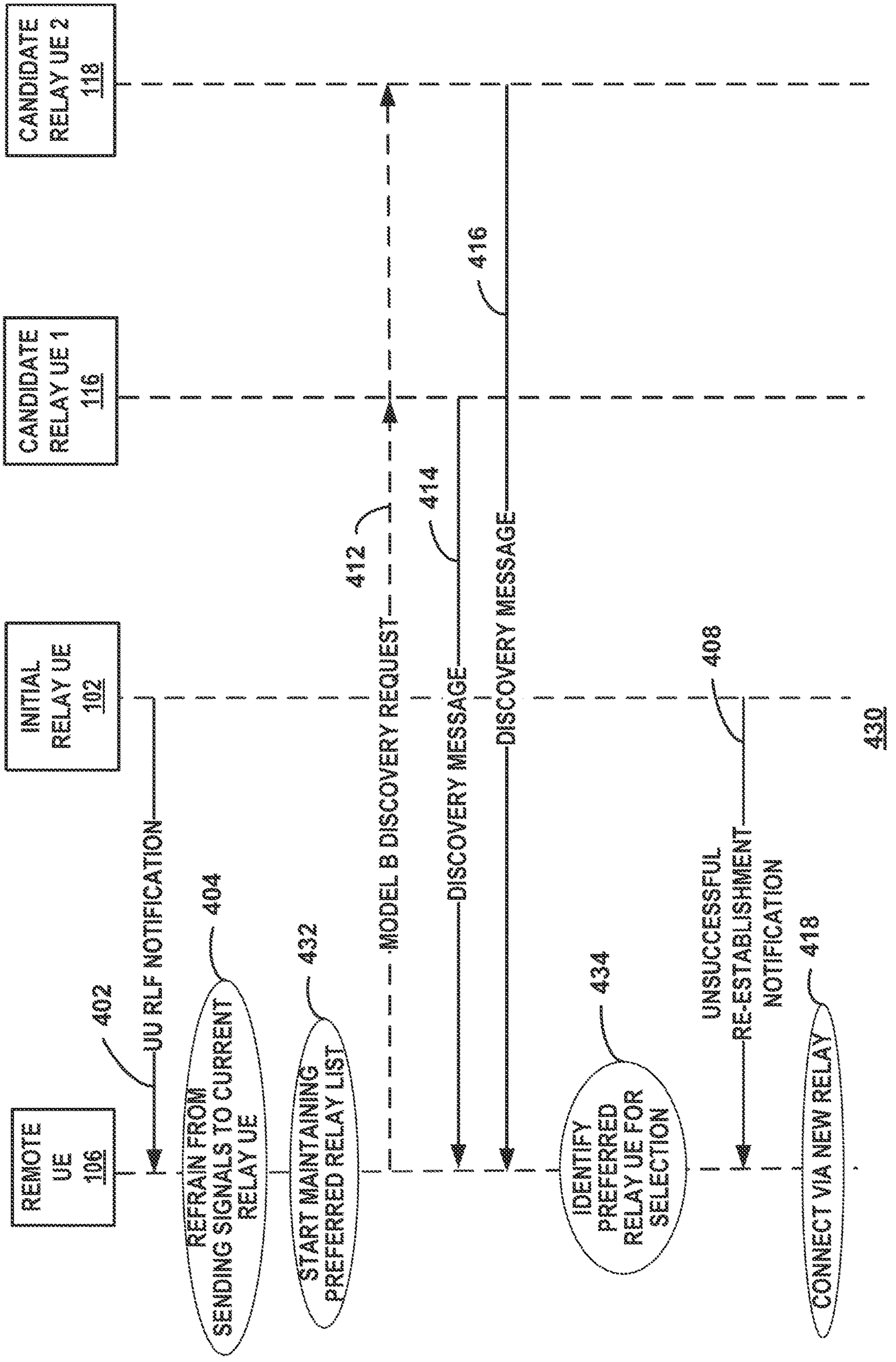
FIG. 4B is a message diagram for an example of relay link management where the remote UE device maintains a preferred relay list in response to receiving a RLF notification.

FIG. 4B is a message diagram 430 for an example of relay link management where the remote UE device 106 maintains a preferred relay list in response to receiving a RLF notification. Although FIG. 4 shows two candidate relay UE devices 116, 118, any number of candidate relay devices may be involved in the messaging. The example begins with the remote UE device 106 connected to the base station via a relay connection through the initial relay UE device 102. Some of the events and transmissions of FIG. 4B are similar to the events and transmission discussed with reference to FIG. 4A and are designated with the same reference numbers.

At transmission 402, the initial relay UE device 102 sends a Uu RLF notification 104 that indicates to the remote UE device 106 that the Uu link between the initial relay UE device 102 and the serving base station (gNB) 108 has experienced a radio failure. At event 404, the remote UE device 106 refrains from sending signals to base station through the current relay UE device 102.

At event 432, the remote UE device continues to refrain from sending signals through the initial relay UE device and begins maintaining a prefer relay list. The remote UE device 106 maintains a candidate relay priority list 156 where the candidate relay UE devices 116, 118, 120 are prioritized for relay service based, at least partially, on their RRC connection status and measured SD-RSRP level. The remote UE device 106 uses the discovery procedure of the transmissions 412, 414, 416 to identify and prioritize the relay UE devices.

At event 434, the remote UE device identifies a preferred relay UE device for establishing a relayed connection to the base station 108. The remote UE device evaluates all of the discovery messages from the candidate relay UE devices, prioritizes the candidate relay UE devices, and determines the relay UE device that has the highest priority. At transmission 408, a reestablishment notification is sent from the initial relay UE device 102 indicating that the reestablishment attempt was unsuccessful.

At event 418, the remote UE device selects a preferred relay UE device and establishes a relayed connection to the base station 108 through the selected relay UE device. In response to the reestablishment notification indicating that the reestablishment attempt was unsuccessful, the remote UE device establishes communication to the base station via the preferred candidate relay UE device.

Figure 4C:
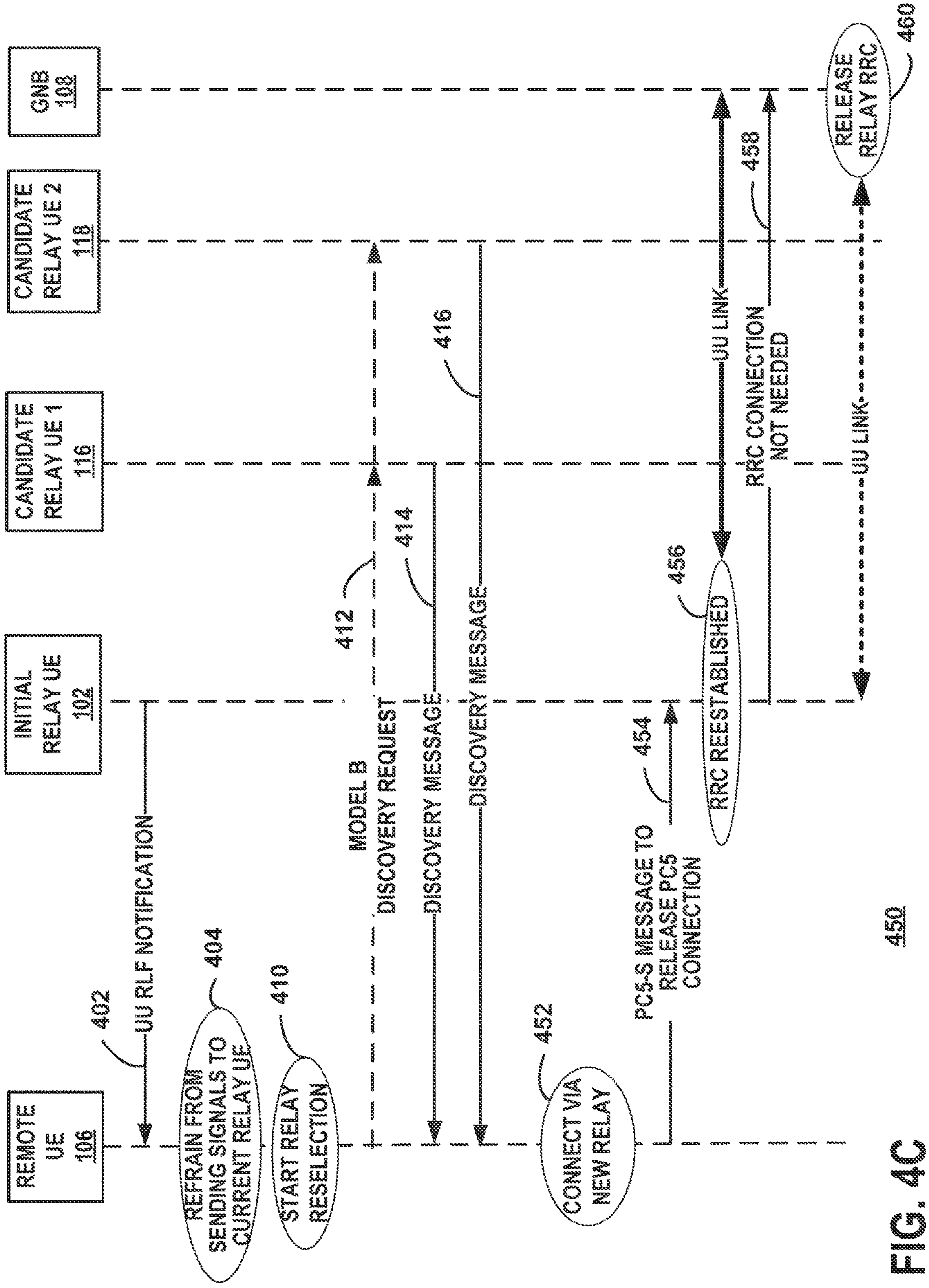
FIG. 4C is a message diagram for an example of relay link management where the remote UE device performs relay reselection in response to receiving a RLF notification.

FIG. 4C is a message diagram 450 for an example of relay link management where the remote UE device 106 performs relay reselection in response to receiving a RLF notification. Although FIG. 4C shows two candidate relay UE devices 116, 118, any number of candidate relay devices may be involved in the messaging. The example begins with the remote UE device 106 connected to the base station via a relay connection through the initial relay UE device 102. Some of the events and transmissions of FIG. 4C are similar to the events and transmission discussed with reference to FIG. 4A and FIG. 4B and are designated with the same reference numbers.

At transmission 402, the initial relay UE device 102 sends a Uu RLF notification 104 that indicates to the remote UE device 106 that the Uu link between the initial relay UE device 102 and the serving base station (gNB) 108 has experienced a radio failure. At event 404, the remote UE device 106 refrains from sending signals to base station through the current relay UE device 102.

At event 410, the remote UE device begins a relay reselection procedure. The remote UE device 106 starts the process of receiving messages and evaluating information to select an alternate relay UE device. The remote UE device 106 uses the discovery procedure of the transmissions 412, 414, 416 to identify and prioritize the candidate relay UE devices.

At event 452, the remote UE device identifies the preferred candidate relay UE device and establishes a relay connection to the base station 108 through the preferred candidate relay UE device. The candidate relay UE devices 116, 118, 120 are prioritized for relay service based, at least partially, on their RRC connection status and measured SD-RSRP level. The remote UE device evaluates all of the discovery messages from the candidate relay UE devices, prioritizes the candidate relay UE devices, and determines the relay UE device that has the highest priority.

At transmission 454, a PC5-S message is sent to the initial relay UE device to release the PC5 connection. At transmission 456, the RRC connection (Uu link) is reestablished between the initial relay UE device 102 and the base station (gNB) 108. For the example of FIG. 4C, therefore, the remote UE device establishes a new relay connection to the gNB 108 through a new relay UE device before the initial relay UE device reestablishes the RRC connection for the Uu link. In other examples, the Uu link is not reestablished.

At transmission 458, the initial relay UE device 102 sends a notification to the base station 108 that the RRC connection for the relay service is not needed. The initial relay UE device 102 determines that the PC5 link was released by the remote UE device. After the Uu link is re-established, the relay UE device 102 informs the base station (gNB) that the PC5 connection to the remote UE device 106 has been released. For the example, the relay UE device informs the base station (gNB) 108 via a SidelinkUEInformationNR message that the relay UE device 102 is no longer PC5 connected to the remote UE device 106. The SidelinkUEInformationNR message identifies the remote UE device 106 with a layer 2 ID of the remote UE device or a remote local UE ID. If the remote UE device identified in the message is the only remote UE that is connected to the initial relay UE device 102, then the gNB may release the RRC connection of the initial relay UE device 102 since it is no longer serving any remote UE devices. For the example, the remote UE device 106 is the only UE device for which the initial relay UE device 102 is providing relay service. As a result, the relay RRC connection is released at event 460 in the example. However, the gNB does not release the RRC connection of the remote UE 106 based on this indication from the relay UE device since the remote UE device may be trying to perform RRC reestablishment to the gNB via another candidate relay UE.

Figure 4D:
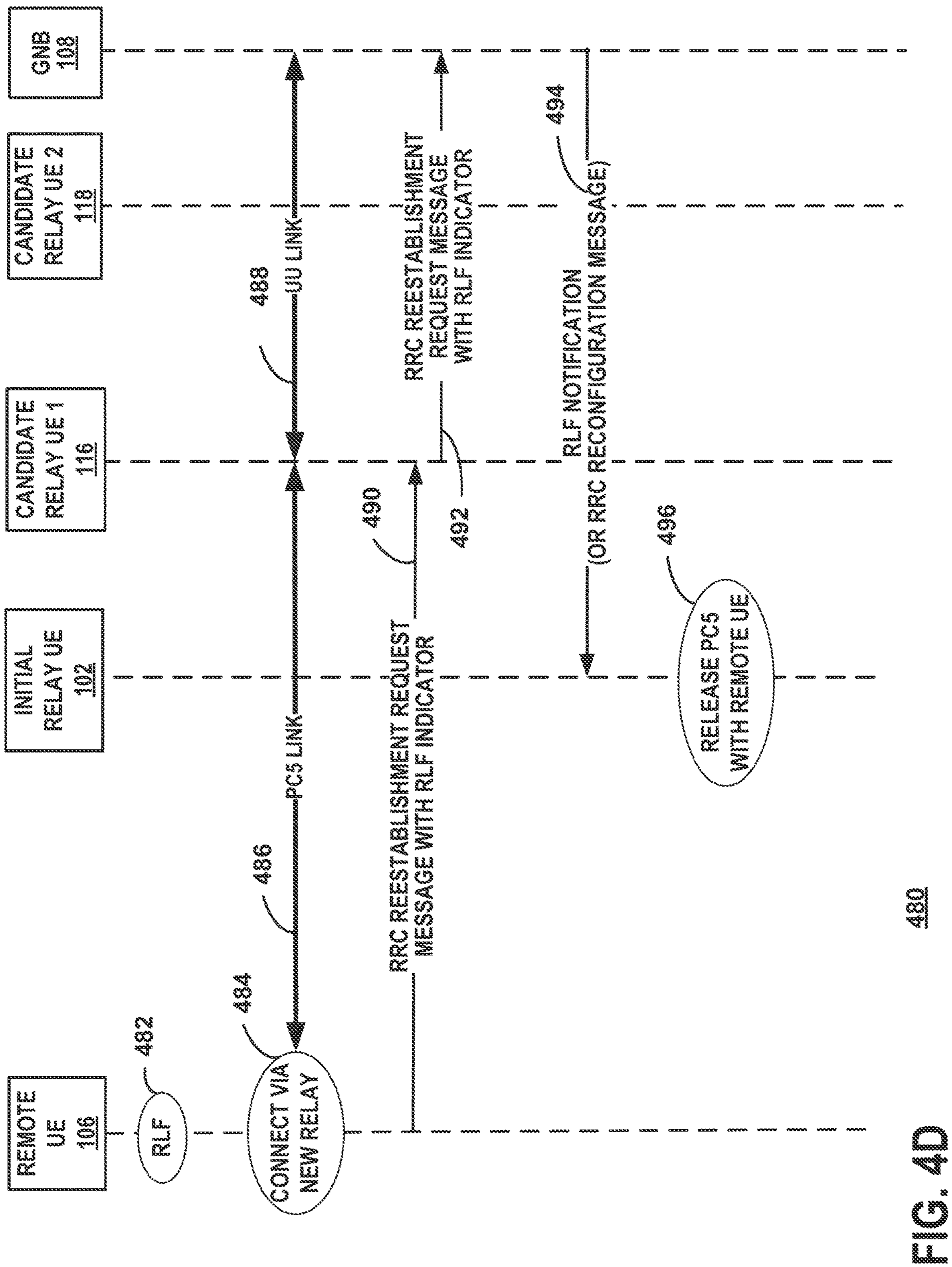
FIG. 4D is a message diagram for an example of relay link management where the remote UE device notifies the base station of the RLF of a previous relayed connection to the base station.

FIG. 4D is a message diagram 480 for an example of relay link management where the remote UE device 106 notifies the base station 208 of the RLF of a previous relayed connection to the base station 108. For the example of FIG. 4D, the remote UE device is RRC connected to the base station 108 through a relayed connection via the initial relay UE device 102 when an RLF is detected at event 482. The RLF may be a PC5 RLF detected by the remote UE device 106 or may be a Uu RLF detected by the initial relay UE device.

At event 484, the remote UE connects to the base station through an alternate UE device 116 to establish a new relayed connection. The relay connection includes a PC5 link 486 to the alternate relay UE device 116 and a Uu link 488 between the alternate relay UE device 116 and the base station 108.

At transmission 490, the remote transmits an RRC reestablishment request message including the RLF indicator. The message is received at the alternate relay UE device 116 and forwarded to the base station (gNB) 108 in the forwarded RRC reestablishment request message 492.

Where the gNB 108 has not received any indication that the initial relay UE device 102 is aware of the PC5 RLF, the gNB 108 transmits an RLF notification to the initial relay UE device 102 at transmission 494. In some situations, the transmission 494 is an RRC reconfiguration message. The transmission 494 (RLF notification or RRC reconfiguration message) invokes the initial relay UE device 102 to inform its upper layer that the PC5 link with the remote UE device 106 has experienced PC5 RLF and that the remote UE device 106 has released the PC5 connection. The initial relay UE device 102's upper layer may also decide to release the PC5 link with the remote UE device 106 at event 496.

Figure 5:
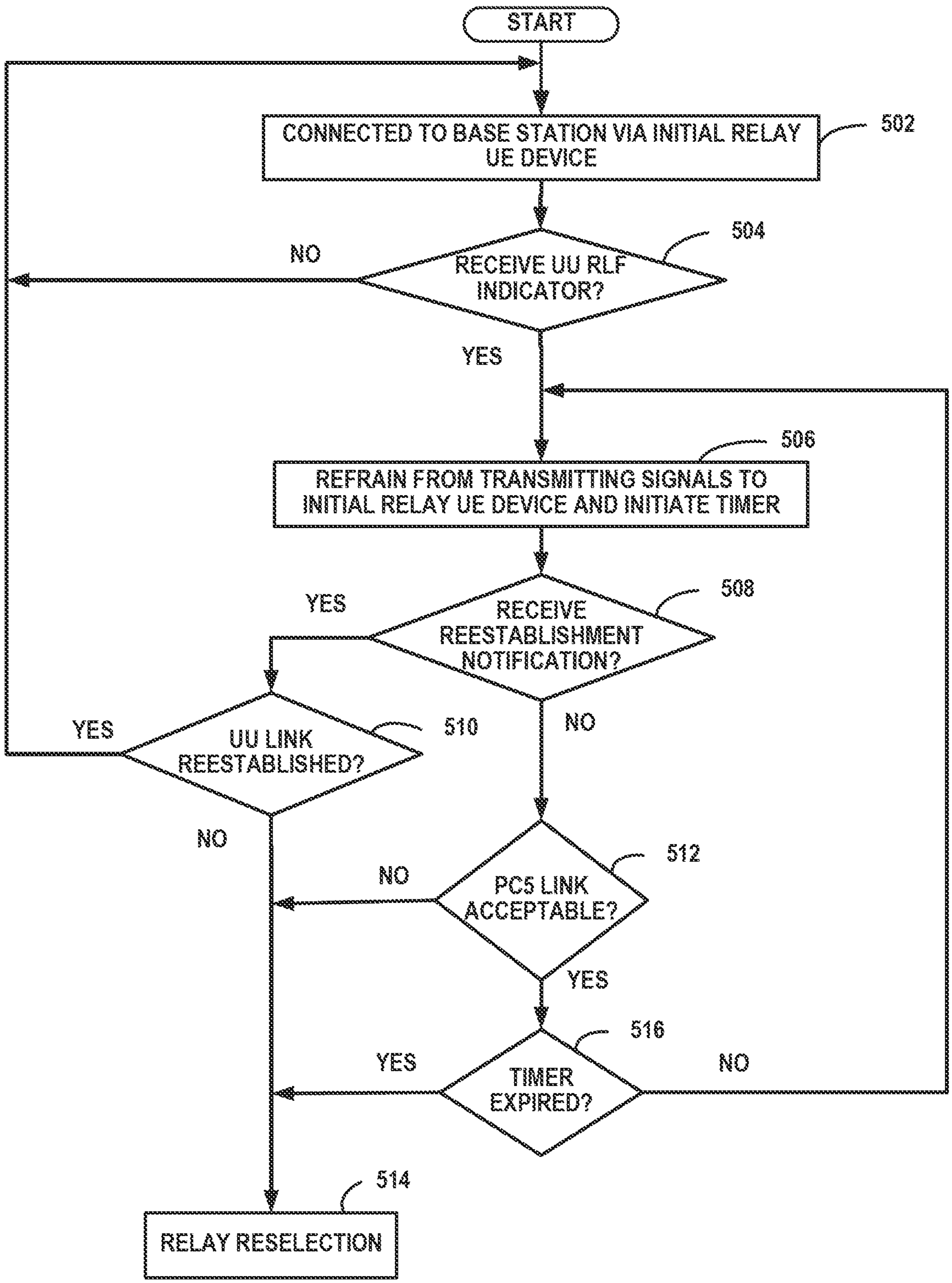
FIG. 5 is a flow chart of an example of a method of managing relay connections where the remote UE device refrains from transmitting signals to the base station via the initial relay UE device in response to receiving an RLF notification.

FIG. 5 is a flow chart of an example of a method 500 of managing relay connections where the remote UE device 106 refrains from transmitting signals to the base station 108 via the initial relay UE device 102 in response to receiving an RLF notification. For the example, the method is performed by a remote UE device such as the remote UE device 106.

At step 502, the remote UE device is engaged in relayed communication through a relay communication link with the base station 108 via the initial relay UE device 102.

At step 504, it is determined whether a Uu RLF notification (indicator) has been received. The remote UE device receives signals from the initial relay UE device and determines whether a PC5-RRC message has been received that indicates the Uu Link between the initial relay UE device and the base station 108 has experiences an RLF. If a Uu RLF notification has been received, the method proceeds to step 506. Otherwise, the method returns to step 502 where the remote UE device continues to communicate through the initial relay UE device 102.

At step 506, the remote UE device 106 refrains from sending signals to the base station 108 through the current relay UE device 102. Accordingly, the remote UE device 106 stops sending data and control signals to the base station 108 over the relay connection that includes the initial relay UE device 102.

At steps 508 and 510, it is determined whether the Uu link has been reestablished. For the example, the remote UE device 106 determines a reestablishment notification has been received at step 508. If no reestablishment notification has been received, the method proceeds to step 512. If a reestablishment notification has been received, the remote UE device determines whether the reestablishment notification indicates the Uu link has been reestablished at step 510. If the Uu link has been reestablished, the method returns to step 502 where relay communication continues through the initial UE device 106. If the Uu link has not reestablished, the method proceeds to step 514.

At step 514, the relay UE device performs a relay reselection procedure to establish a new relay connection to the base station. In some situations, the relay reselection procedure includes determining whether a direct connection to the base station 108 can be established.

At step 512, it is determined if the PC5 link to the initial relay UE device has failed. In addition to the PC5 link experiencing an RLF, the PC5 link may be determined to have failed where the quality of the link is no longer meeting the requirements of the remote UE device. This may occur, for example, where the distance between the remote UE device and the initial relay UE device has increased. Accordingly, where the PC5 link has failed or is no longer provides an acceptable connection, the remote initiates relay reselection at step 514. Otherwise, the method proceeds to step 516.

At step 516, it is determined whether the timer has expired. The timer provides a mechanism for the remote UE device to avoid a situation where the Uu link has not been reestablishment for longer than a time period that is acceptable to the remote UE device. If no reestablishment notification has been received before the timer has expired, the remote UE device performs the relay reselection at step 514. Otherwise, the method returns to step 506.

Figure 6:
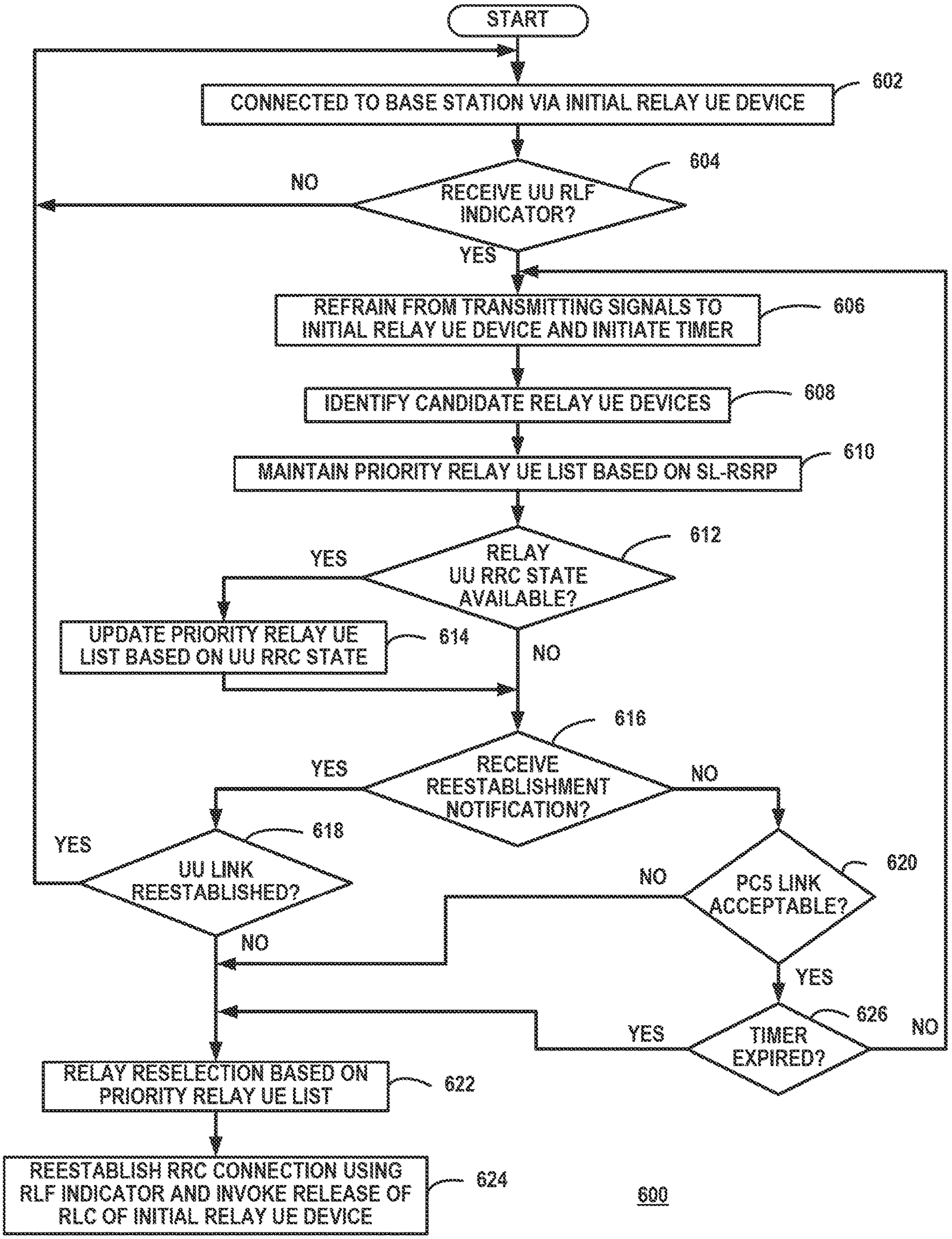
FIG. 6 is a flow chart of an example of a method of managing relay connections where the remote UE device refrains from transmitting signals to the base station via the initial relay UE device and maintains a relay priority list in response to receiving an RLF notification.

FIG. 6 is a flow chart of an example of a method 600 of managing relay connections where the remote UE device 106 refrains from transmitting signals to the base station 108 via the initial relay UE device 102 and maintains a relay priority list in response to receiving an RLF notification. For the example, the method is performed by a remote UE device, such as the remote UE device 106.

At step 602, the remote UE device is engaged in relayed communication through a relay communication link with the base station 108 via the initial relay UE device 102.

At step 604, it is determined whether a Uu RLF notification (indicator) has been received. The remote UE device receives signals from the initial relay UE device and determines whether a PC5-RRC message has been received that indicates the Uu Link between the initial relay UE device and the base station 108 has experiences an RLF. If a Uu RLF notification has been received, the method proceeds to step 606. Otherwise, the method returns to step 602 where the remote UE device continues to communicate through the initial relay UE device 102.

At step 606, the remote UE device 106 refrains from sending signals to the base station 108 through the current relay UE device 102. Accordingly, the remote UE device 106 stops sending data and control signals to the base station 108 over the relay connection that includes the initial relay UE device 102.

At step 608, the remote UE device 106 identifies candidate relay UE devices. Using the discovery procedure, the remote UE device 106 receives discovery messages from nearby UE devices and measures the SD-RSRP levels to identify potential UE devices that can be used for relay service to the base station 108.

At step 610, the remote UE device maintains a relay priority list based on at least the measure SD-RSRP levels. The remote UE device prioritizes the candidate relay UE devices based on the measured SD-RSRP levels and updates the list as new information is received.

At step 612, it is determined whether relay Uu RRC connection state is available for the candidate relay UE devices. For the example, the Uu RRC connection state is provided by each candidate relay UE device by the transmitted discovery message. If the Uu RRC connection states are available, the relay priority list is update based on the Uu RRC connections states before the method provide to step 616. Otherwise, the method proceeds to step 616.

At steps 616 and 618, it is determined whether the Uu link has been reestablished. For the example, the remote UE device 106 determines a reestablishment notification has been received at step 616. If no reestablishment notification has been received, the method proceeds to step 620. If a reestablishment notification has been received, the remote UE device determines, at step 618, whether the reestablishment notification indicates the Uu link has been reestablished. If the Uu link has been reestablished, the method returns to step 602 where relay communication continues through the initial UE device 106. If the Uu link has not reestablished, the method proceeds to step 622.

At step 620, it is determined if the PC5 link to the initial relay UE device has failed. In addition to the PC5 link experiencing an RLF, the PC5 link may be determined to have failed where the quality of the link is no longer meeting the requirements of the remote UE device. This may occur, for example, where the distance between the remote UE device and the initial relay UE device has increased. Accordingly, where the PC5 link has failed or is no longer provides an acceptable connection, the remote initiates relay reselection at step 622. Otherwise, the method proceeds to step 626.

At step 626, it is determined whether the timer has expired. The timer provides a mechanism for the remote UE device to avoid a situation where the Uu link has not been reestablishment for longer than a time period that is acceptable to the remote UE device. If no reestablishment notification has been received before the timer has expired, the remote UE device performs the relay reselection at step 622. Otherwise, the method returns to step 606.

At step 622, the relay UE device performs the relay reselection procedure based on the relay priority list. Accordingly, the highest priority candidate relay UE device is selected as the preferred relay UE device. In some situations, the relay reselection procedure includes determining whether a direct connection to the base station 108 can be established.

At step 624, the RRC connection to the base station 108 is reestablished using the RLF indicator. For the examples, the remote UE device 106 sends an RRC reestablishment request to the base station over the new relayed connection through the selected preferred relay UE device where the request includes an RLF indicator. The RLF indicator can indicate whether the RLF occurred on the PC5 link or the UU link. For the example of FIG. 6, the RLF indicator indicates the Uu link has experienced the RLF. The reestablishment of the RRC connection invokes the release of the radio link control (RLC) to the initial relay UE device 102 by the gNB 108.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A remote user equipment device (UE) comprising:

a transceiver comprising a transmitter and a receiver, the transceiver configured to communicate with a base station through an initial relay UE device that is communicating with the base station over a Uu communication link;

a controller configured to determine that a radio link failure (RLF) of the Uu communication link has occurred;

the receiver configured to receive a link re-establishment notification indicating whether the Uu communication link has been re-established;

the transmitter configured to:

in response to the determination of the occurrence of the RLF, refrain from transmitting signals to the base station, in response to the receiver receiving the link re-establishment notification indicating the Uu communication link has been re-established, transmit a signal to the base station.

2. The remote UE device of claim 1, wherein the receiver is further configured to receive a RLF notification indicating the RLF has occurred and wherein the controller is configured to determine that the Uu RLF has occurred based on the RLF notification.

3. The remote UE device of claim 2, wherein the controller is further configured to:

in response to the determination that the RLF of the Uu communication link has occurred, perform a relay reselection procedure.

4. The remote UE device of claim 3, wherein the relay reselection procedure establishes an alternate relayed connection through an alternate relay UE device to the base station, the transmitter configured to send an RRC reestablishment request to the base station after the alternate relayed connection has been established, the RRC reestablishment request comprising an RLF indicator indicating a cause of a failure of an initial relayed connection to the base station through the initial relay UE device.

5. The remote UE device of claim 4, wherein the RLF indicator indicates one of a PC5 RLF and a Uu RLF.

6. The remote UE device of claim 2, wherein the controller is further configured to:

in response to the receiver receiving the link re-establishment notification indicating the Uu communication link could not be re-established, perform a relay reselection procedure.

7. The remote UE device of claim 6, wherein the relay reselection procedure establishes an alternate relayed connection through an alternate relay UE device to the base station, the transmitter configured to send an RRC reestablishment request to the base station after the alternate relayed connection has been established, the RRC reestablishment request comprising an RLF indicator indicating a cause of a failure of an initial relayed connection to the base station through the initial relay UE device.

8. The remote UE device of claim 7, wherein the RLF indicator indicates one of a PC5 RLF and a Uu RLF.

9. The remote UE device of claim 6, wherein:

the receiver is configured to receive a first radio resource control (RRC) connection status notification indicating a current connection status of a first candidate relay UE device to a base station;

the receiver is configured to receive a second RRC connection status notification indicating a current connection status of a second candidate relay UE device to the base station; and the controller is configured to perform the relay reselection procedure to identify a preferred candidate relay UE device, from the first candidate relay UE device and the second candidate relay UE device, based at least partially on the first RRC connection status notification and the second RRC connection status notification.

10. The remote UE device of claim 9, wherein the first RRC connection status notification is received in a first discovery message from the first candidate relay UE device and the second RRC connection status notification is received in a second discovery message from the second candidate relay UE device.

11. The remote UE device of claim 10, wherein each of the first RRC connection status notification and the second RRC connection status notification is indicative of one of a plurality of RRC connected states comprising connected (RRC CONN), idle (RRC IDLE), or inactive (RRC INACTIVE).

12. The remote UE device of claim 2, wherein the controller is further configured to:

in response to receiving the RLF notification, identify a preferred candidate relay UE device and, in response to the receiver receiving the link reestablishment notification indicating the Uu communication link could not be reestablished, selecting the preferred candidate relay UE device for communication to the base station.

13. The remote UE device of claim 12, wherein the controller is further configured to select the preferred candidate relay UE device to establish an alternate relayed connection through the preferred candidate relay UE device to the base station, the transmitter configured to send an RRC reestablishment request to the base station after the alternate relayed connection has been established, the RRC reestablishment request comprising an RLF indicator indicating a cause of a failure of an initial relayed connection to the base station through the initial relay UE device.

14. The remote UE device of claim 13 wherein the RLF indicator indicates one of a PC5 RLF and a Uu RLF.

15. The remote UE device of claim 12, wherein:

the receiver is configured to receive a first radio resource control (RRC) connection status notification indicating a current connection status of a first candidate relay UE device to a base station;

the receiver is configured to receive a second RRC connection status notification indicating a current connection status of a second candidate relay UE device to the base station; and the controller is configured to identify the preferred candidate relay UE device, from the first candidate relay UE device and the second candidate relay UE device, based at least partially on the first RRC connection status notification and the second RRC connection status notification.

16. The remote UE device of claim 15, wherein the first RRC connection status notification is received in a first discovery message from the first candidate relay UE device and the second RRC connection status notification is received in a second discovery message from the second candidate relay UE device.

17. The remote UE device of claim 16, wherein each of the first RRC connection status notification and the second RRC connection status notification is indicative of one of a plurality of RRC connected states comprising connected (RRC CONN), idle (RRC IDLE), or inactive (RRC INACTIVE).

* * * * *